Figure 1:
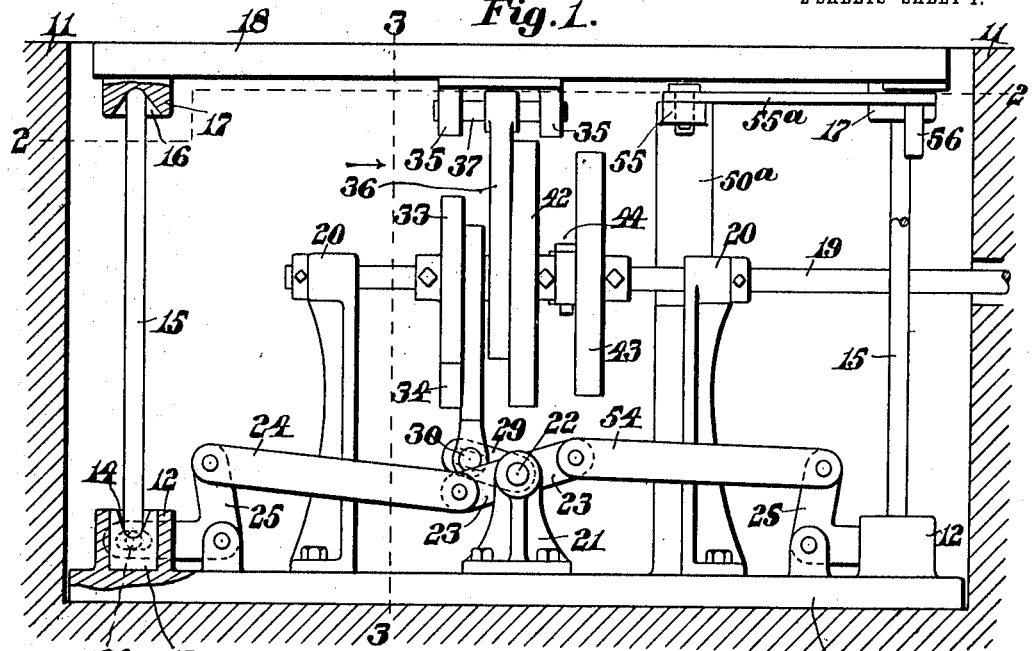

J. A. CLAUSON.
AGITATING PLATFORM.
APPLICATION FILED JAN. 18, 1911.

1,020,344.

Patented Mar. 12, 1912.

2 SHEETS—SHEET 1.

Witnesses:
Nathan C. Lombard.
Hartley W. Bartlett.

Inventor:
Joseph A. Clauson,
by Walter E. Lombard,
Atty.

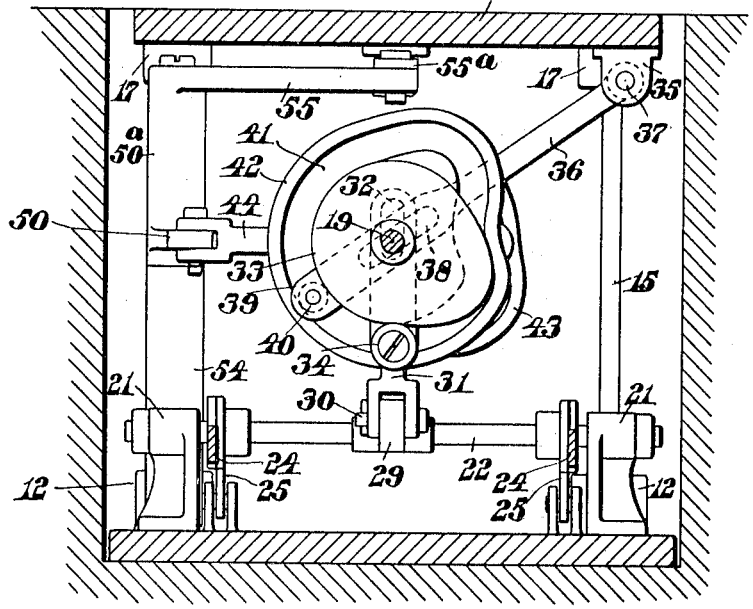
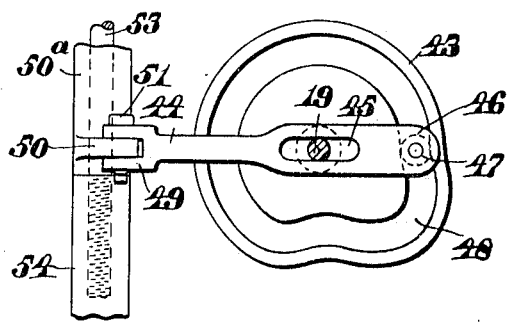
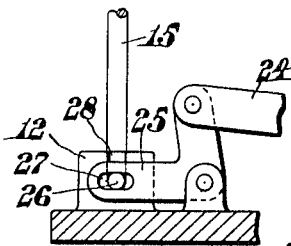

UNITED STATES PATENT OFFICE.

JOSEPH A. CLAUSON, OF BOSTON, MASSACHUSETTS.

AGITATING-PLATFORM.

1,020,344.  Specification of Letters Patent.  Patented Mar. 12, 1912.

Application filed January 18, 1911. Serial No. 603,394.

*To all whom it may concern:*

Be it known that I, JOSEPH A. CLAUSON, a citizen of the United States of America, a resident of Boston, in the county of Suffolk and State of Massachusetts, have invented certain new and useful Improvements in Agitating-Platforms, of which the following is a specification.

This invention relates to devices for producing motion in several directions but more particularly to agitating or vibrating molds.

In the molding of artificial stone and other substances produced by the solidifying of liquids, air bubbles form in the mixture, and, unless these are removed before the mixture becomes solid, the product is not fit for use. On account of the composition of these mixtures, it is extremely difficult if not practically impossible to stir the same to remove these bubbles, and the only available method is to so agitate the mass as a whole that the bubbles will be worked out.

Devices have heretofore been constructed to provide agitation in a horizontal direction and these have frequently been used in molding machines and the like but such a device would not cause the removal of the bubbles in a liquid as there is no motion in a vertical direction.

Not only does the present device agitate or vibrate the mixture horizontally and vertically, but it is preferably so constructed that the motion in each direction is distinct and is completed prior to the commencing of the motion in the succeeding direction. By this process, the contents of the mold are entirely freed of bubbles and formed into a compact and homogeneous mass. In the applicant's preferred embodiment, the motions are positive so that a mold of great weight may be agitated as efficiently as a small mold. While the applicant has adapted his device for use in thus agitating or vibrating molds, he is aware that the same could be used in a large number of other ways and he does not limit himself to the particular use or embodiment herein described.

One embodiment of the invention is shown in the drawings in which:—

Figure 2:
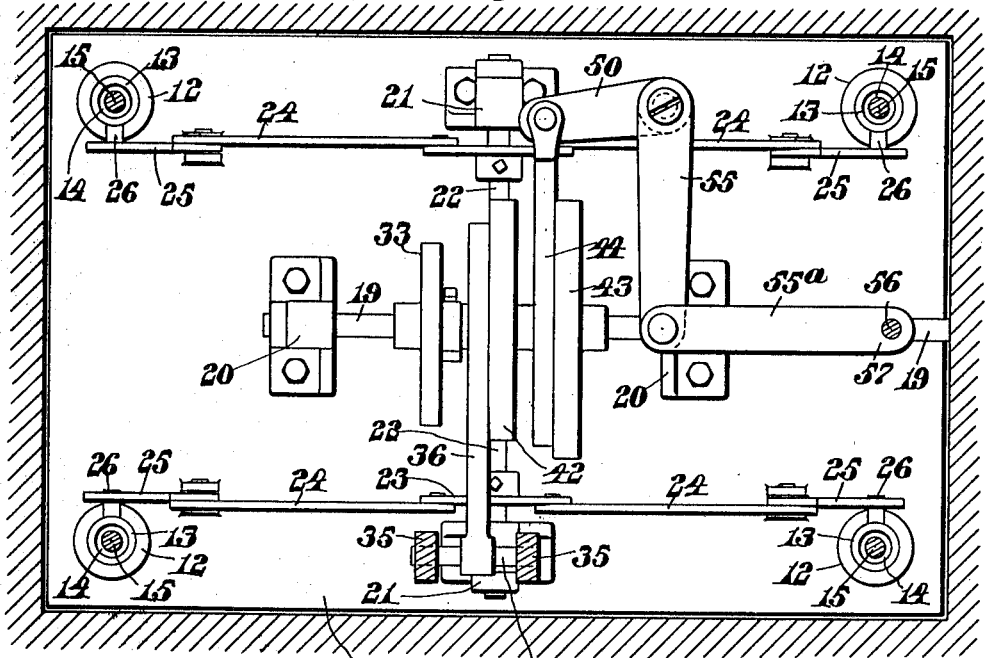

Figure 1 is a side elevation of the invention complete. Fig. 2, section on line 2—2 of Fig. 1. Fig. 3, section on line 3—3 of Fig. 1. Figs. 4 and 5, detailed views, as will be described hereinafter.

Referring to the drawings:—the base 10 rests on the bottom of the pit 11 and upon this base plate 10 at the four corners thereof are located slotted sleeves 12. Slidably mounted within each of these sleeves is a block 13 provided with a conical socket 14 in which rests the lower extremity of the legs 15. The upper extremities of these legs rest in conical sockets 16 in blocks 17 on the under face of the table 18.

A power shaft 19, driven by any suitable means, is mounted in bearings 20. Upon the base 10 are secured bearings 21 in which is mounted a shaft 22. Centrally secured to this shaft is an arm 23, the extremities of which are pivotally connected to the link mechanisms 24 and the outer slotted extremities 25 of these link mechanisms are connected to the blocks 13 in the sleeves 12 by means of the pins 26 which have their inner extremities secured to the blocks 13 and their outer extremities entering the slots 27 in the extremities 25 of the link mechanism. The sleeves 12 are provided with slots 28 to permit the blocks 13 to be raised by the link mechanisms 24 and to thus raise the table 18 resting on the legs 15. To the shaft 22 is secured another arm 29 which is slotted at its upper extremity to receive the pin 30 which connects this arm with the arm 31. This arm 31 is provided at its upper extremity with a slot 32 through which passes the main operating shaft 19. Upon this shaft 19 is fastened a cam 33 which acts upon the roller 34 upon the arm 31 to depress the arm 29 and thus cause the table 18 to be raised by the action of the link mechanism 24.

To the lugs 35 on the under face of the table 18 is connected the arm 36 by means of the pivot rod 37. These lugs should be sufficiently spaced to permit the table to move longitudinally on the rod 37 without striking the upper extremity of the rod 36. This rod 36 is provided with a slot 38 through which passes the main shaft 19 and upon the extremity 39 of this rod 36 is mounted a roller 40 which is adapted to slide in the slot 41 in the cam 42 to cause the table to be moved transversely. This cam 42 is secured to the power shaft 19 and is preferably arranged and constructed so that it will not operate the table until the completion of the operation of the link mechanism 24 by the cam 33.

Upon the power shaft 19 is fixed a third cam 43 which is shown in detail in Fig. 4 as it is practically concealed by the cam 42 in Fig. 3. An arm 44 is provided with a slot 45 through which passes the shaft 19 and upon the extremity 46 of this arm is mounted a roller 47 which acts in the cam slot 48 of the cam 43 to cause the arm 44 to reciprocate. The extremity 49 of the arm 44 is connected to the arm 50 by means of the pin 51 passing through the slot 52 in the arm 50. The other extremity of this arm 50 is secured to the sleeve 50ª pivoted upon the rod 53 extending upwardly from the post 54 and to the upper portion of this sleeve is secured one extremity of the arm 55, the other extremity being pivotally connected to the link 55ª. Extending downwardly from the under face of the table 18 is a pin 56 which passes through the extremity 57 of the link 55ª to permit this link to vibrate the table longitudinally. The cam 43 is preferably arranged and constructed so that the arm 44 remains in this normal position until the completion of the operation of the arm 36 by the cam 42. It has been found to be advantageous to so construct each of the cams 33, 42, and 43 so that they each vibrate the table during a third of a revolution of the power shaft and that the arrangement be such that the operation by each cam shall be distinct and shall not commence until the operation of the preceding cam has been completed. It will be readily evident that the cams may be so located upon the shaft that the movements of the table will occur in any pre-determined order, but for the sake of illustration they have been arranged to first vertically vibrate the table, then transversely, and then longitudinally, this operation being repeated with each revolution of the shaft.

It has been found advantageous to locate this device in a pit as is shown in the drawings so that the table 18 shall be flush with the flooring of the building to facilitate the rolling of heavy molds thereon but such a construction is not necessary and the base 10 may rest upon the flooring or in any other suitable place as desired.

The applicant has shown a special construction to perform the desired operation merely for the purpose of illustration and he does not limit his invention to the construction and arrangement of parts herein shown and described as anyone skilled in the art may readily alter the construction in a great variety of ways without departing from the scope of the invention.

I claim—

1. In a device of the class described, a table with a horizontal surface and provided with sockets on its under face; a bed plate having upwardly extending guide members; a movable block in each guide member having a socket therein; a leg interposed between the socket in each movable block and each table socket; means for simultaneously imparting a vertical movement to said movable blocks; and means for imparting a horizontal movement to said table.

2. In a device of the class described, a table with a horizontal surface and provided with sockets on its under face; a bed plate having upwardly extending guide members; a movable block in each guide member having a socket therein; a leg interposed between the socket in each movable block and each table socket; means for simultaneously imparting a vertical movement to said movable sockets; and means for imparting reciprocating movements to said table in both a longitudinal and a transverse direction.

3. In a device of the class described, a table with a horizontal surface; movable supports therefor permitting horizontal movement of said table; means for raising and lowering said supports and table; a revoluble shaft; a cam thereon; a bell-crank lever operable thereby having a vertical pivot; and a link connecting one arm of said lever with said table and adapted to impart to said table a horizontal movement.

4. In a device of the class described, a table with a horizontal surface; movable supports therefor permitting horizontal movement of said table; means for raising and lowering said supports and table; a revoluble shaft; a cam thereon; and an arm pivotally secured to the under face of said table operable by said cam to impart a horizontal reciprocation to said table and provided with a slot through which said revoluble shaft extends.

5. In a device of the class described, a table with a horizontal surface and provided with sockets on its under face; a bed plate having upwardly extending guide members; a movable block in each guide member having a socket therein; a leg interposed between the socket in each movable block and each table socket; a rocker shaft; arms secured thereto; a bell-crank lever pivotally connected to each movable block; and a link connecting each bell-crank lever with one of said rocker shaft arms.

6. In a device of the class described, a table with a horizontal surface and provided with sockets on its under face; a bed plate having upwardly extending guide members; a movable block in each guide member having a socket therein; a leg interposed between the socket in each movable block and each table socket; a rocker shaft; arms secured thereto; a bell-crank lever pivotally connected to each movable block; a link connecting each bell-crank lever with one of said rocker shaft arms; a revoluble shaft; a cam thereon; and means operable by said cam for imparting movement to said rocker shaft.

Signed by me at 4 Post Office Sq., Boston, Mass., this 17th day of January, 1911.

JOSEPH A. CLAUSON.

Witnesses:
 WALTER E. LOMBARD,
 NATHAN C. LOMBARD.

Copies of this patent may be obtained for five cents each, by addressing the "Commissioner of Patents, Washington, D. C."